United States Patent
Kohno et al.

(10) Patent No.: US 8,921,689 B2
(45) Date of Patent: Dec. 30, 2014

(54) DYE-SENSITIZED SOLAR CELL

(75) Inventors: Mitsuru Kohno, Kitakyusyu (JP); Yoshihiro Yamaguchi, Kitakyusyu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 115 days.

(21) Appl. No.: 13/320,120

(22) PCT Filed: May 25, 2010

(86) PCT No.: PCT/JP2010/003472
§ 371 (c)(1),
(2), (4) Date: Nov. 11, 2011

(87) PCT Pub. No.: WO2010/150461
PCT Pub. Date: Dec. 29, 2010

(65) Prior Publication Data
US 2012/0055549 A1    Mar. 8, 2012

(30) Foreign Application Priority Data

Jun. 24, 2009 (JP) .................. 2009-149234

(51) Int. Cl.
*H01L 31/00* (2006.01)
*H01L 31/0224* (2006.01)
*H01G 9/20* (2006.01)

(52) U.S. Cl.
CPC ............. *H01G 9/2022* (2013.01); *Y02E 10/542* (2013.01); *H01G 9/2059* (2013.01); *H01G 9/2031* (2013.01)
USPC .......................................... 136/256; 136/263

(58) Field of Classification Search
CPC ..... H01G 9/20; H01G 9/2022; H01G 9/2059; H01G 9/2068
USPC ........................................... 136/255–256, 263
See application file for complete search history.

(56) References Cited

U.S. PATENT DOCUMENTS

| | | | |
|---|---|---|---|
| 2006/0289056 A1* | 12/2006 | Gondo et al. | 136/263 |
| 2006/0289057 A1* | 12/2006 | Gonda et al. | 136/263 |
| 2007/0289628 A1* | 12/2007 | Sohn et al. | 136/264 |

FOREIGN PATENT DOCUMENTS

| | | |
|---|---|---|
| CN | 101093876 A | 12/2007 |
| JP | 2001-283941 A1 | 10/2001 |

(Continued)

OTHER PUBLICATIONS

International Search Report for International Application No. PCT/JP2010/003472 dated Aug. 31, 2010.

(Continued)

*Primary Examiner* — Devina Pillay
*Assistant Examiner* — Andrew Golden
(74) *Attorney, Agent, or Firm* — Kratz, Quintos & Hanson, LLP

(57) ABSTRACT

There is provided a dye-sensitized solar cell high in power generation efficiency.

A dye-sensitized solar cell 10 includes: a transparent substrate 12; a conductive substrate 14; a porous semiconductor layer 16 containing a dye adsorbed thereto; and a conductive metal layer 18 arranged in contact with a side of the porous semiconductor layer 16 opposite to the transparent substrate 12 and serving as an anode electrode.

The conductive metal layer 18 is formed of a metallic porous body having through-holes, and a multitude of holes of the metallic porous body are isotropically communicated with one another. The metallic porous body has a specific surface area of 0.1 m²/g or larger, a porosity of 30 to 60 vol. %, and a pore diameter of 1 μm to 40 μm, and is formed of a metal material, such as Ti, W, Ni, Pt or Au.

4 Claims, 4 Drawing Sheets

(56) References Cited

FOREIGN PATENT DOCUMENTS

| | | |
|---|---|---|
| JP | 2004-39471 A1 | 2/2004 |
| JP | 2005-158470 A1 | 6/2005 |
| JP | 2005-317453 A1 | 11/2005 |
| JP | 2007-200559 A1 | 8/2007 |
| JP | 2008-004550 A | 1/2008 |
| WO | WO 2009/075229 A1 | 6/2009 |

OTHER PUBLICATIONS

Office Action issued Jul. 30, 2014 by The State Intellectual Property Office of the People's Republic of China in counterpart application No. 201080023413.1.

* cited by examiner

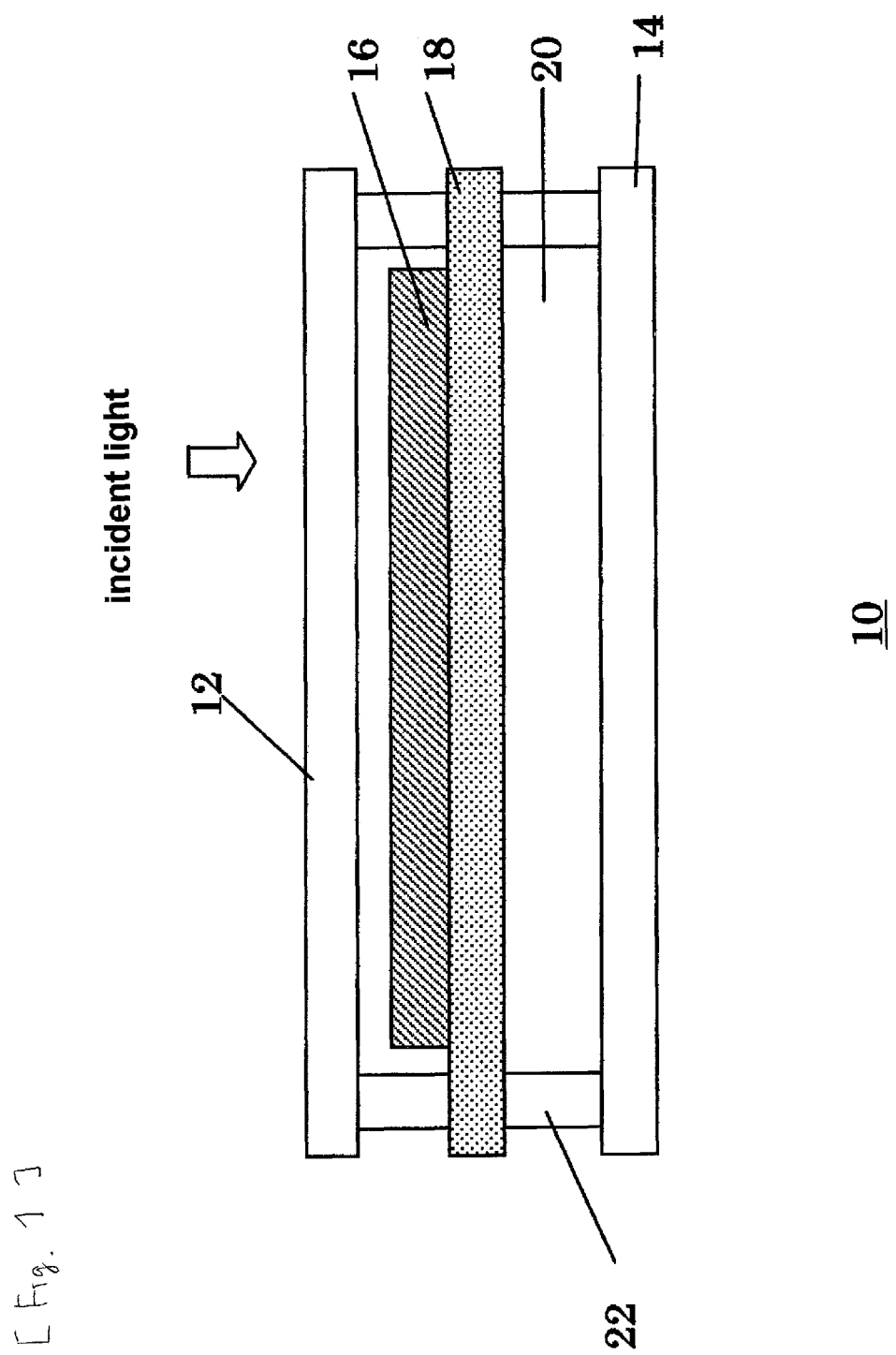

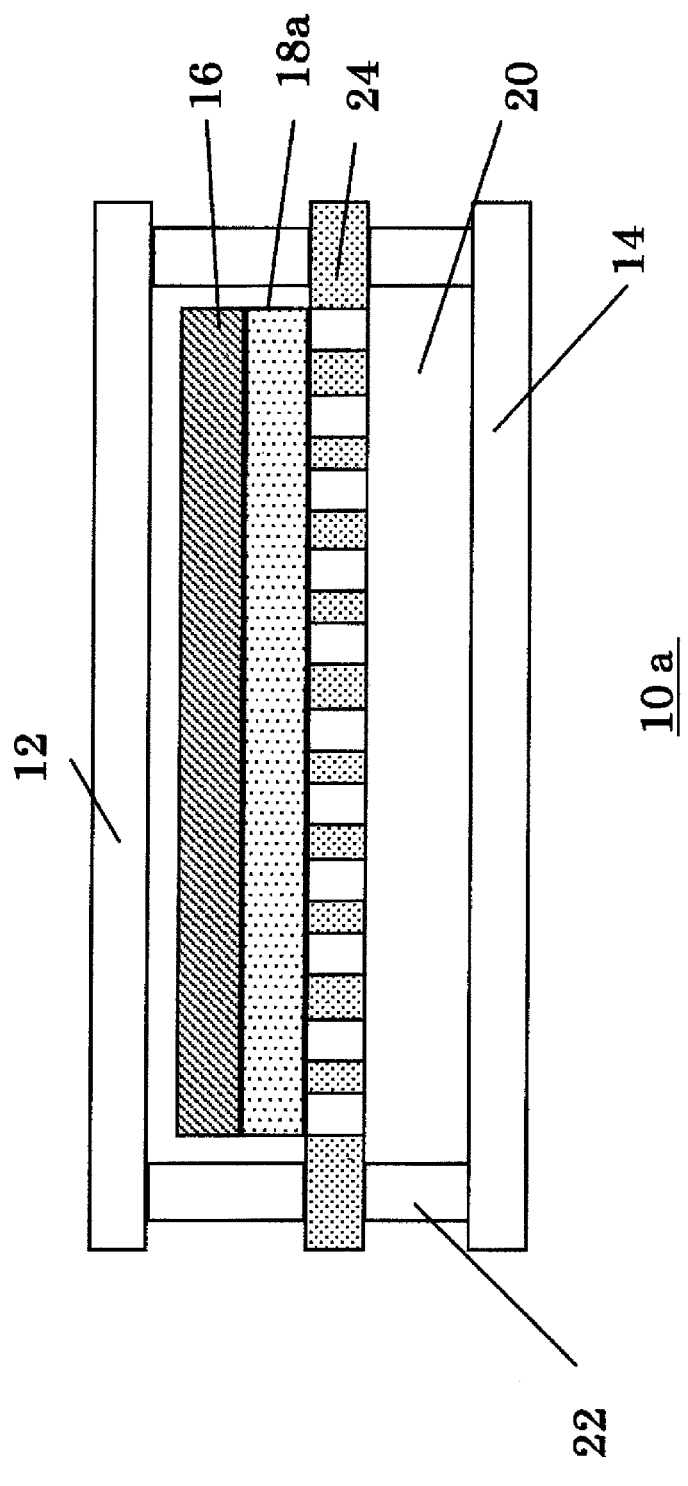

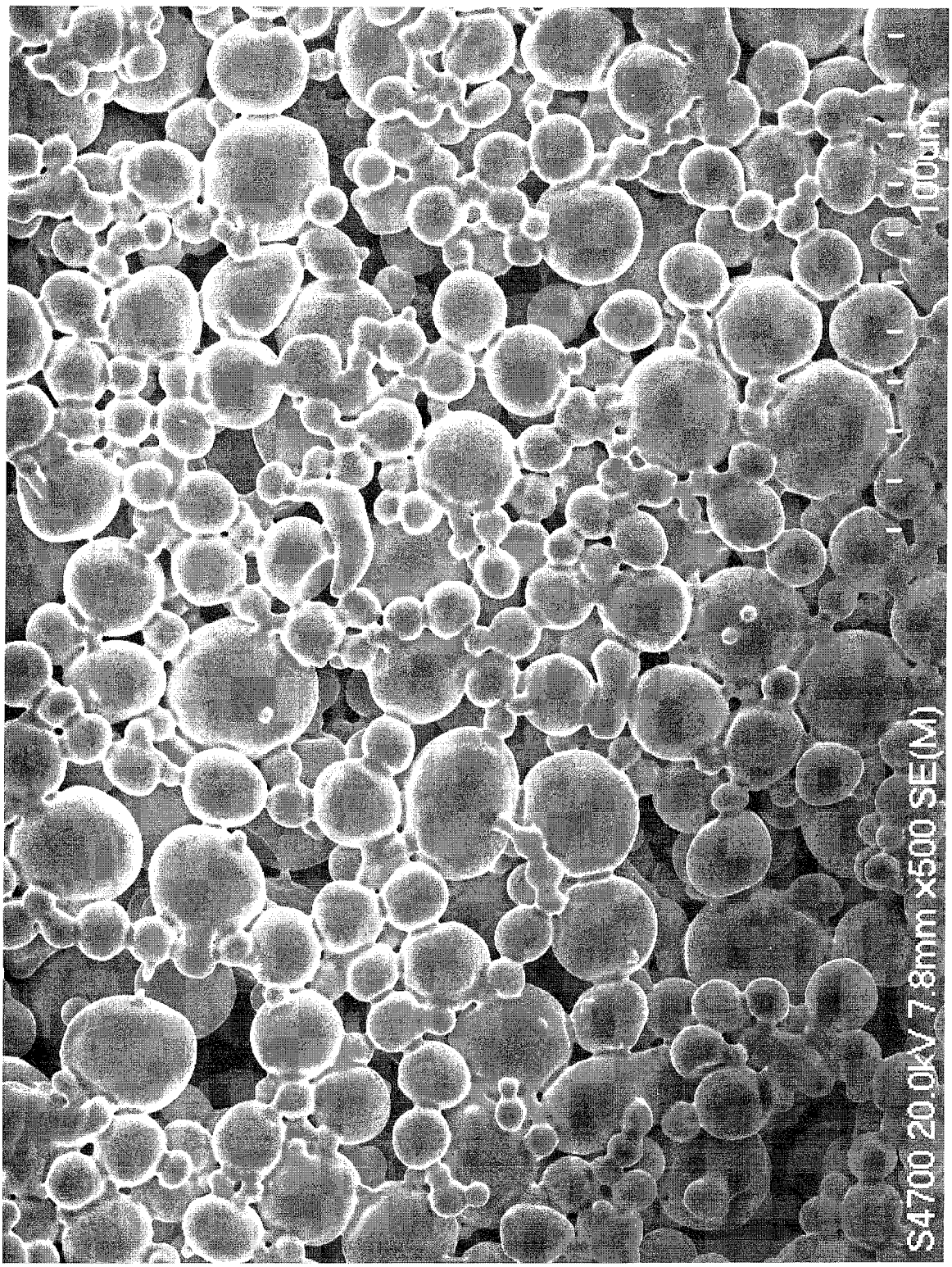
[Fig. 3(A)]

[Fig. 3(B)]
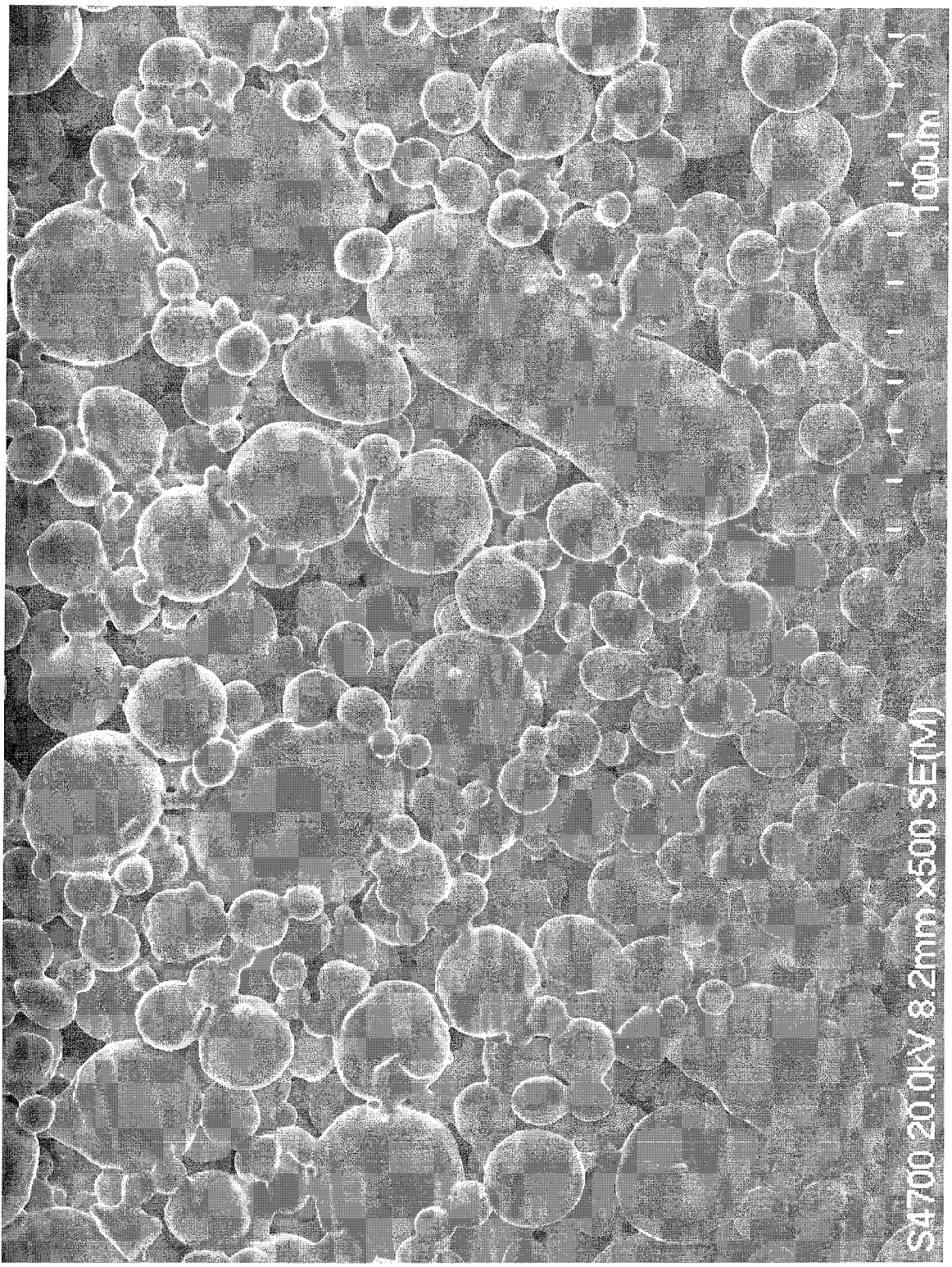

DYE-SENSITIZED SOLAR CELL

TECHNICAL FIELD

The present invention relates to a dye-sensitized solar cell.

BACKGROUND ART

The dye-sensitized solar cell is also referred to as a wet solar cell, a Graetzel cell, or the like, and is characterized by having an electrochemical cell structure as typified by an iodine solution without using a silicon semiconductor. In general, the dye-sensitized solar cell has a simple structure in which an iodine solution or the like is disposed as an electrolyte solution between a porous semiconductor layer, such as a titania layer, formed by baking titanium dioxide powder or the like onto a transparent conductive glass plate (a transparent substrate having a transparent conductive film laminated thereon) and making a dye adsorbed onto the baked powder, and a counter electrode composed of a conductive glass plate (conductive substrate).

The electrical generation mechanism of the dye-sensitized solar cell is as follows:

A dye adsorbed to the porous semiconductor layer absorbs light entering from a surface of a transparent conductive glass plate which is a light-receiving surface, thus causing electron excitation. Electrons thus excited migrate to a semiconductor and are introduced to the conductive glass. Then, electrons having returned to a counter electrode are introduced to the dye stripped of electrons through an electrolytic solution, such as iodine, thus reproducing the dye.

The dye-sensitized solar cell is inexpensive in terms of the materials thereof and does not need a large-scaled facility for its fabrication, thus attracting attention as a low-cost solar cell. For the purpose of further cost reduction, a study is being made, for example, to exclude the expensive transparent conductive film.

One example of a method for excluding the transparent conductive film is to provide wiring made of conductive metal in place of the transparent conductive film present on a glass surface. In this case, however, part of incident light is blocked by the metal wiring, thus involving efficiency degradation.

As means for making improvements in this regard, there is disclosed a photoelectric conversion element (see Patent Literature 1) in which a dye-carrying semiconductor layer, for example, is formed on a transparent substrate having no transparent conductive films which is a light irradiation side, and a perforated collecting electrode is arranged on the dye-carrying semiconductor layer. The patent literature states that the perforated collecting electrode has a net-like or grid-like structure, and that this collecting electrode is placed on a coated film of a porous semiconductor substrate and calcined at 500° C. for 30 minutes.

In addition, there is disclosed, for example, a photoelectric conversion device in which a collecting electrode is made linear, mesh-like or porous (see Patent Literature 2). Note however that Patent Literature 2 does not mention either any specific porous structures or any methods for fabricating the porous structures in regard to making the collecting electrode porous.

Citation List

Patent Literatures

Patent Literature 1: Japanese Patent Laid-Open No. 2001-283941

Patent Literature 2: Japanese Patent Laid-Open No. 2007-200559

SUMMARY OF INVENTION

Technical Problem

However, both of the above-described related arts have room for further improvement in terms of further enhancing power generation efficiency.

The present invention has been accomplished in view of the above-described problems. Accordingly, an object of the present invention is to provide a dye-sensitized solar cell capable of further improving power generation efficiency.

Solution to Problem

A dye-sensitized solar cell according to the present invention includes: a transparent substrate; a conductive substrate serving as a cathode electrode; a porous semiconductor layer containing a dye adsorbed thereto and arranged between the transparent substrate and the conductive substrate in vicinity to or contact with the transparent substrate; and a conductive metal layer arranged in contact with a side of the porous semiconductor layer opposite to the transparent substrate and serving as an anode electrode, the dye-sensitized solar cell containing an electrolyte sealed therein, wherein the conductive metal layer is formed of a metallic porous body having through-holes and a multitude of holes of the metallic porous body are isotropically communicated with one another, and the metallic porous body sheet has a specific surface area of $0.1\ m^2/g$ or larger, a porosity of 30 to 60 vol.%, and a pore diameter of 1 μm to 40 μm.

In addition, the metallic porous body of the dye-sensitized solar cell according to the present invention is preferably a calcined body made of metal microparticles and the size of the metal microparticles is 100 μm or smaller in diameter.

Still additionally, the metallic porous body of the dye-sensitized solar cell according to the present invention is preferably formed of one or more than one metal material selected from the group consisting of Ti, W, Ni, Pt and Au.

Still additionally, the dye-sensitized solar cell according to the present invention preferably includes a perforated metal layer provided on a surface of the conductive metal layer opposite to the porous semiconductor layer.

Advantageous Effect of Invention

A dye-sensitized solar cell according to the present invention is configured so that a conductive metal layer arranged in contact with a side of a porous semiconductor layer opposite to a transparent substrate and serving as an anode electrode is formed of a metallic porous body sheet having through-holes, a multitude of holes of the metallic porous body sheet are isotropically communicated with one another, and the metallic porous body sheet has a specific surface area of $0.1\ m^2/g$ or larger, a porosity of 30 to 60 vol.%, and a pore diameter of 1 μm to 40 μm. Consequently, it is possible to further improve power generation efficiency.

BRIEF DESCRIPTION OF DRAWINGS

FIG. 1 is a drawing illustrating a schematic configuration of a dye-sensitized solar cell according to the present embodiment.

FIG. 2 is a drawing illustrating a schematic configuration of a dye-sensitized solar cell according to a modified example of the present embodiment.

FIG. 3A is a SEM photograph of a porous Ti sheet (trade-named Tiporous and made by Osaka Titanium Technologies) used to fabricate a dye-sensitized solar cell of an embodiment, and is a view taken from the principal surface (front surface) side of the sheet.

FIG. 3B is a SEM photograph of a porous Ti sheet (trade-named Tiporous and made by Osaka Titanium Technologies) used to fabricate a dye-sensitized solar cell of an embodiment, and is a view taken from a cross-sectional side of the sheet.

DESCRIPTION OF EMBODIMENTS

Embodiments of the present invention (hereinafter referred to as the present embodiment) will be described hereinafter with reference to the accompanying drawings.

A dye-sensitized solar cell according to the present embodiment is concerned with a technique of using a conductive metal layer to be arranged in contact with a side of a porous semiconductor layer opposite to a transparent substrate and to serve as an anode electrode, instead of using a transparent conductive film as a collecting electrode.

As schematically illustrated in FIG. 1, a dye-sensitized solar cell 10 according to the present embodiment includes: a transparent substrate 12; a conductive substrate 14 serving as a cathode electrode; a porous semiconductor layer 16 containing a dye adsorbed thereto and arranged between the transparent substrate 12 and the conductive substrate 14 in vicinity to or contact with the transparent substrate 12; and a conductive metal layer 18 arranged in contact with a side of the porous semiconductor layer 16 opposite to the transparent substrate 12 and serving as an anode electrode, the dye-sensitized solar cell 10 containing an electrolyte (electrolytic solution) 20 sealed therein. Note that in FIG. 1, reference numeral 22 denotes a spacer for sealing the dye-sensitized solar cell 10.

The conductive metal layer 18 is formed of a metallic porous body having through-holes, and a multitude of holes of the metallic porous body are isotropically communicated with one another (not illustrated; see FIG. 3). Here, the phrase "isotropically communicated with one another" refers to a condition in which a multitude of holes are not only communicated with one another only in the thickness direction of the conductive metal layer, i.e., so as to have anisotropy, as in the case of related arts, to form through-holes, but also communicated with one another also in a direction along a plane of the conductive metal layer, i.e., so as to have isotropy three-dimensionally in every direction.

As the result of the conductive metal layer 18 being formed of the metallic porous body having through-holes and a multitude of holes of the metallic porous body being isotropically communicated with one another, an electrolyte passing through the conductive metal layer 18 uniformly infiltrates into every part of the porous semiconductor layer 16. In contrast, in the case of a conventional conductive metal layer in which holes are communicated with one another, so as to have anisotropy, to form through-holes, the infiltration of the electrolyte 20 may be limited only to part of the porous semiconductor layer near openings of the through-holes.

In addition, a multitude of holes distribute planarly, isotropically, and in communication with one another also in surface portions of the conductive metal layer 18 in contact with the porous semiconductor layer 16. Accordingly, the conductive metal layer 18 has a large area of contact with the porous semiconductor layer 16 which is an aggregate of particles, and particles of a surface of the porous semiconductor layer 16 engage with holes of a surface of the conductive metal layer 18 in a so-called state of being meshed with the holes. Consequently, a bonding force applied between the conductive metal layer 18 and the porous semiconductor layer 16 is large. In contrast, in the case of a conventional conductive metal layer, openings of through-holes are arranged discretely in a direction along a plane of the conductive metal layer and the number of openings is often limited, or the conductive metal layer is formed into a smooth sheet-like shape. Consequently, it is in some cases difficult to secure a large bonding force between the conductive metal layer and the porous semiconductor layer. This disadvantage is more apparent when a metal mesh is used as the conductive metal layer or the through-holes are formed by means of machining. For this reason, in the case of the conventional conductive metal layer, cracks may be produced in an electrical bonding process based on heating at approximately 500° C., for example, due to a small bonding force. Consequently, the conductive metal layer and the porous semiconductor layer may separate from each other. In contrast, cracks are less likely to be produced in the conductive metal layer 18 of the present embodiment.

A material of the conductive metal layer 18 is not limited in particular, but is preferably one or more than one metal material selected from the group consisting of Ti, W, Ni, Pt and Au, or a compound thereof. Consequently, there can be obtained a conductive metal layer excellent in corrosion resistance to iodine in the electrolyte 20 used as charge-transporting ions.

The thickness of the conductive metal layer 18 is not limited in particular, but is preferably on the order of 1 μm to 600 μm. If the thickness of the conductive metal layer 18 is less than 1 μm, the electrical resistance of the conductive metal layer 18 may rise. On the other hand, if the thickness of the conductive metal layer 18 exceeds 600 μm, the flow resistance of the electrolyte 20 may be excessively high. Consequently, the migration of the electrolyte 20 passing through the interior of the conductive metal layer 18 may be disturbed. Note that the electrical resistance of the conductive metal layer 18 is preferably 1Ω/□ or lower.

The specific surface area of the metallic porous body constituting the conductive metal layer 18 is preferably 0.1 m$^2$/g or larger. Consequently, it is possible to further increase a bonding force between the conductive metal layer 18 and the porous semiconductor layer 16.

The upper limit of the specific surface area of the metallic porous body is not limited in particular, but an upper limit of approximately, for example, 10 m$^2$/g is sufficient.

Note that the specific surface area can be measured by a mercury penetration method. Using mercury penetration pore distribution measurement devices (Pascal 140 and Pascal 440: measurable ranges: specific surface area=0.1 m$^2$/g minimum, micropore distribution=0.0034 to 400 μm, made by CARLO ERBA INSTRUMENTS), a specific surface area measurement based on a mercury penetration method is made over the pressure ranges of 0.3 kPa to 400 kPa and 0.1 MPa to 400 MPa by calculating injection volumes as lateral areas according to a cylindrical micropore model and integrating the lateral areas. Note that porosity and a pore diameter to be described later are available concurrently in this measurement.

The metallic porous body constituting the conductive metal layer 18 preferably has a porosity of 30 to 60 vol. % and a pore diameter of 1 μm to 40 μm.

If the porosity is lower than 30 vol. %, the diffusion of the electrolyte within the metallic porous body is insufficient.

Consequently, uniform infiltration of the electrolyte into the porous semiconductor layer 16 may be disturbed. On the other hand, if the porosity exceeds 60 vol. %, the bonding force between the conductive metal layer 18 and the porous semiconductor layer 16 may be impaired.

In addition, if the pore diameter is smaller than 1 μm, the diffusion of the electrolyte within the metallic porous body is insufficient. Furthermore, as the result of holes of the conductive metal layer 18 being insufficiently meshed with particles of the porous semiconductor layer 16, the bonding force between the conductive metal layer 18 and the porous semiconductor layer 16 may be impaired. On the other hand, if the pore diameter exceeds 40 μm, an area of contact between the conductive metal layer 18 and the porous semiconductor layer 16 becomes smaller. Consequently, the bonding force between the conductive metal layer 18 and the porous semiconductor layer 16 may be impaired.

The porosity and pore diameter can be measured by a mercury penetration method.

Components of the dye-sensitized solar cell 10 other than the conductive metal layer 18 can be fabricated by an appropriate method by using commonly adopted appropriate materials. Examples of these materials and methods will be cited below.

The transparent substrate 12 may be, for example, a glass plate or a plastic plate. If a plastic plate is used, PET, PEN, polyimide, hardened acrylic resin, hardened epoxy resin, hardened silicone resin, various engineering plastics, cyclic polymer available by metathesis polymerization, and the like may be mentioned as examples.

For the conductive substrate 14, the same substrate as the transparent substrate 12 is used and a conductive film, such as ITO (tin-doped indium film), FTO (fluorine-doped tin oxide film) or an $SnO_2$ film, is laminated on a surface of the substrate facing the electrolyte 20. In addition, a catalytic film, such as a platinum film, is provided on the conductive film.

As a material of the porous semiconductor layer 16, an appropriate material, such as ZnO or $SnO_2$, may be used, but $TiO_2$ is preferred. The microparticle shape of $TiO_2$ or the like is not limited in particular, but is preferably on the order of 1 nm to 100 nm. The thickness of the porous semiconductor layer 16 is not limited in particular, but is preferably 10 μm or greater. The porous semiconductor layer 16 is preferably formed to a desired thickness by repeating operation to form a thin film of $TiO_2$ paste and then calcine the thin film at a temperature of, for example, 300 to 550° C.

A dye is adsorbed to surfaces of microparticles constituting the porous semiconductor. The dye has an absorption band in a wavelength of 400 nm to 1000 nm. Examples of the dye may include metal complex, such as ruthenium dye and phthalocyanine dye, and an organic dye, such as cyanine dye. A method of adsorption is not limited in particular but may be, for example, a so-called impregnation method in which a porous conductive metal layer including a porous semiconductor layer formed therein is immersed in a dye solution to chemisorb the dye to surfaces of microparticles.

The transparent substrate 12 and the porous semiconductor layer 16 may be or may not be in contact with each other. It is desirable, however, that a distance between the substrate and the layer is as short as possible. One possible method for arranging the conductive metal layer 18 and the conductive substrate (counter electrode) 14, so as not to bring the layer and the substrate into contact with each other, is to isolate the layer and the substrate from each other by using a spacer, such as a glass paper, having corrosion resistance to the electrolyte 20 and holes adequate enough to avoid disturbing the diffusion of electrolytic ions. The distance between the porous conductive metal layer 18 and the conductive substrate 14 is preferably 100 μm or shorter.

The electrolyte 20 is not limited in particular, but contains iodine, lithium ions, an ionic liquid, t-butylpyridine, and the like. In the case of, for example, iodine, an oxidation-reduction body composed of a combination of iodide ions and iodine may be used. The oxidation-reduction body contains an appropriate solvent capable of dissolving the body. A method for injecting the electrolyte 20 is not limited in particular. One possible method is to leave part of a sealing material open without sealing the material, inject the electrolyte 20 from the opening, and seal the opening. Another possible method is to previously provide an opening in part of the conductive substrate 14, and inject the electrolyte 20 from the opening, and then seal the opening.

For the spacer 22 used to inject the electrolyte 20 into between the transparent substrate 12 and the conductive substrate 14 after lamination and seal the electrolyte, it is possible to use a semicured resin sheet or the like the thickness of which after hardening is 100 μm or less.

The conductive metal layer 18 can also be obtained by an appropriate manufacturing method. For example, a method can be adopted in which metal paste is prepared on an appropriate substrate by mixing metal fine powder with an appropriate solvent. After the metal paste is heated to a calcination temperature under a substantially oxygen-free ambient atmospheric condition, a calcined body of the metal paste is transferred onto the porous semiconductor layer 16. In this case, the whole of this subassembly is calcined at the calcination temperature of the material of the porous semiconductor layer 16 with the calcined body of the metal paste transferred onto an uncalcined material of the porous semiconductor layer 16. Preferably, the whole of the subassembly is reheated at appropriate temperature also when the calcined body of the metal paste is transferred onto the calcined porous semiconductor layer 16. Alternatively, after thick metal paste is calcined, the calcined body may be sliced to a desired thickness. Then, the sliced calcined body may be laminated on the porous semiconductor layer 16 as the conductive metal layer 18.

At this time, a commercially-available sheet of a calcined body of metal fine powder trade-named, for example, Tiporous (made by Osaka Titanium Technologies) may be used as the conductive metal layer 18, as will be described later.

The dye-sensitized solar cell 10 according to the present embodiment is configured so that the electrolyte (electrolytic solution) passing through the conductive metal layer 18 uniformly infiltrates into every part of the porous semiconductor layer 16. Consequently, electrolytic ions diffuse excellently, and therefore, high efficiency (photoelectric conversion efficiency) can be attained.

In addition, the dye-sensitized solar cell 10 has a large bonding force between the conductive metal layer 18 and the porous semiconductor layer 16, and is excellent in electrical contact. Yet additionally, the dye-sensitized solar cell 10 is less likely to suffer electrical contact failure due to, for example, separation between the conductive metal layer 18 and the porous semiconductor layer 16. Accordingly, high efficiency (photoelectric conversion efficiency) can be attained.

Still additionally, the dye-sensitized solar cell 10 can reduce cost per unit power generation efficiency (or unit electricity generated).

Here, use of a calcined body of metal microparticles as the metallic porous body of the conductive metal layer 18 makes suitably available the above-described operational effects of the dye-sensitized solar cell 10 according to the present embodiment. In this case, the metal microparticle size of the calcined body of 100 μm or smaller in diameter is preferred in terms of allowing the electrolyte (electrolytic solution) passing through the conductive metal layer 18 to uniformly infiltrate into every part of the porous semiconductor layer 16. The lower limit of the diameter of metal microparticles is not limited in particular. From the viewpoint of securing a bonding force between the conductive metal layer 18 and the porous semiconductor layer 16, however, the diameter is preferably 1 μm or larger.

Note that the diameter of metal microparticles can be measured using a SEM (scanning electron microscope). A diameter (mean value of major axes and minor axes) of 100 particles (primary particles) is measured from an observed image available by the use of the SEM, and a value obtained as the average of those diameters is defined as the diameter.

Here, as the metallic porous body of the conductive metal layer 18, it is also possible to use a sponge-like aggregate of metal microparticles in place of the calcined body thereof.

Next, a modified example of the dye-sensitized solar cell 10 according to the present embodiment will be described with reference to FIG. 2.

A dye-sensitized solar cell 10a according to the modified example schematically illustrated in FIG. 2 differs in a portion thereof corresponding to the conductive metal layer 18 of the dye-sensitized solar cell 10. The rest of the dye-sensitized solar cell 10a is the same in configuration as the dye-sensitized solar cell 10. Accordingly, the rest of the configuration that has already been discussed with regard to the dye-sensitized solar cell 10 will not be described again.

The dye-sensitized solar cell 10a is configured so that perforated metal foil (perforated metal layer) 24 is bonded to a surface of a conductive metal layer 18a opposite to the porous semiconductor layer 16. The material of the conductive metal layer 18a and other conditions are the same as those of the conductive metal layer 18.

The thickness of the conductive metal layer 18a is not limited in particular, but may be on the order of, for example, several tens of μm.

The perforated metal foil 24 is formed of appropriate conductive metal, preferably high-conductivity metal, such as platinum. Holes of the perforated metal foil 24 are formed by means of, for example, machining or chemical treatment. The structure of each hole in the perforated metal foil 24 thus obtained is the above-described through-hole having anisotropy. The thickness of the perforated metal foil 24 is not limited in particular. From the viewpoint of, for example, securing a certain degree of rigidity, however, a sum of the thicknesses of the conductive metal layer 18a and the perforated metal foil 24 may be made the same as the thickness of the conductive metal layer 18.

Note that the perforated metal foil 24 is cited only as an example of the perforated metal layer. As the perforated metal layer, a metal mesh or the like may be used in place of the perforated metal foil 24.

The dye-sensitized solar cell 10a according to the modified example is configured so that the conductive metal layer 18a is in contact with the porous semiconductor layer 16, and the flow of the electrolyte 20 flowing into the perforated metal foil 24 is, in a manner, straightened by the conductive metal layer 18a, so as to uniformly infiltrate into every part of the porous semiconductor layer 16. Consequently, it is possible to attain the same operational effects as those of the dye-sensitized solar cell 10 according to the present embodiment.

In addition, since the thickness of the conductive metal layer 18a can be reduced, it is possible to obtain the dye-sensitized solar cell 10a at low cost and with a simplified structure. Yet additionally, since the conductive metal layer 18a is formed on the perforated metal foil 24, it is possible to easily manufacture the conductive metal layer 18a. Still additionally, it is possible to further improve the osmosis of the electrolyte into every part of the porous semiconductor layer 16 by reducing the thickness of the conductive metal layer 18a. Still additionally, since both the perforated metal foil 24 and the conductive metal layer 18a are made of metal materials, a difference in thermal expansion coefficient between the materials is small. Consequently, cracks are less likely to occur at the time of heat treatment. In particular, if the perforated metal foil 24 and the conductive metal layer 18a are made of the same metal species, the abovementioned effect is prominent and is, therefore, preferable.

EXAMPLES

Hereinafter, examples of the present invention will be described, though the present invention is not limited to these examples.

Example 1

Titania paste (trade-named Nanoxide D and made by Solaronix) was printed on a 5 mm×20 mm area of a 100 μm-thick porous Ti sheet 103 (trade-named Tiporous and made by Osaka Titanium Technologies), and dried. Thereafter, the titania paste was calcined in the air at 400° C. for 30 minutes. Operation to further print the titania paste on titania after calcination and calcine the titania paste was repeated a total of six times, thereby forming a 17 μm-thick titania layer 102 on one side of the porous Ti sheet. Measurement of the pore size distribution and the like of the porous Ti sheet 103 by a mercury penetration method showed that pore volume=0.159 cc/g (porosity=40.1%), specific surface area=5.6 m$^2$/g, average pore diameter=8 μm (60% of the pore volume was 4 to 10 μm).

FIG. 3 illustrates a SEM photograph of the porous Ti sheet. FIG. 3A is a photograph when the sheet was viewed from the principal surface (front surface) side thereof, whereas FIG. 3B is a photograph when the sheet was viewed from a cross-sectional side thereof.

The fabricated porous Ti sheet substrate provided with the titania layer was soaked in an acetonitrile/t-butylalcohol mixed solvent solution of an N719 dye (made by Solaronix) for 70 hours, thereby adsorbing the dye onto surfaces of titania. The substrate after adsorption was cleaned with an acetonitrile/t-butylalcohol mixed solvent.

A 60 μm-thick semicured resin sheet (SX1170-60 made by Solaronix) was sandwiched between a 2 mm-thick quartz glass plate and the dye-adsorbed substrate, so that the glass plate and the dye-adsorbed titania layer side of the substrate faced each other, and was bonded and laminated at 115° C. At that time, the semicured resin sheet was arranged so as to surround the titania layer, while avoiding bringing the sheet into contact therewith. In addition, approximately 1 mm gaps were provided in two places, so that an electrolytic solution could be injected later.

The abovementioned semicured resin sheet was sandwiched and laminated between the laminated plate and a 1.1 mm-thick glass plate 105 provided with a Pt film, so that the porous Ti sheet side of the laminated plate and the Pt side of the glass plate 105 faced each other, and was bonded at 115° C.

An electrolytic solution of an acetonitrile solvent composed of iodine and LiI was injected from the approximately 1 mm gaps to fabricate a dye-sensitized solar cell.

The photoelectric conversion performance of the dye-sensitized solar cell thus obtained was examined by measuring the IV curve thereof when the solar cell was irradiated with 100 mW/cm$^2$-intensity pseudo sunlight (a pseudo sunlight device made by Yamashita Denso was used) from the quartz glass plate side of the solar cell. Photoelectric conversion efficiency was 7.1%.

Example 2

Ti particles (20 μm or smaller in particle diameter, made by Osaka Titanium Technologies), terpineol (a mixture of α-terpineol, β-terpineol and γ-terpineol), and a vehicle composed primarily of ethyl cellulose (material prepared by dissolving thermoplastic cellulose ether in a solvent, trade-named EC-Vehicle, and made by Nisshin Kasei; model number: EC-200FTD) were mixed to prepare a paste of Ti particles. A 5 mm×20 mm area of one side of 20 μm-thick Ti foil was coated with the Ti particle paste prepared as described above, and dried. Thereafter, the Ti particle paste was calcined in an argon atmosphere at 400° C. for one hour, thereby forming an approximately 20 μm-thick porous Ti layer on the Ti foil.

Using a roll laminator, dry film resist was attached tightly to both sides of the Ti foil bearing the porous Ti layer formed thereon. In addition, a mask bearing a pattern formed therein in which circular dots, 50 μm in diameter, were laid out at 100 μm pitches was placed in a 5 mm×20 mm area of the dry film resist on a surface of the Ti foil on the side thereof on which the porous Ti layer was not formed. Then, ultraviolet ray exposure was applied to the Ti foil from both sides thereof. After the development of the dry film resist, through-holes were provided only in the Ti foil by using an etchant capable of dissolving the Ti foil. Thereafter, the dry film resist was separated off. In this way, there was obtained a metal electrode bearing the porous Ti layer on one side of the Ti foil having circular through-holes of 50 μm in diameter.

Titania paste (trade-named Nanoxide D and made by Solaronix) was printed on a 5 mm×20 mm area of the porous Ti layer of the metal electrode, and dried. Then, the titania paste was calcined in the air at 400° C. for 30 minutes. Operation to further print the titania paste on titania after calcination and calcine the titania paste was repeated a total of four times, thereby forming a 12 μm-thick titania layer on the porous Ti layer.

A dye-sensitized solar cell was fabricated in the same way as in Example 1 for a step of dye adsorption and subsequent steps. Photoelectric conversion efficiency was 7.6%.

Comparative Example 1

A dye-sensitized solar cell was fabricated in the same way as in the examples, except that a 600 μm-thick porous Ti sheet was used. The photoelectric conversion efficiency of the dye-sensitized solar cell thus obtained was 3.8%.

Comparative Example 2

A plurality of 50 μm×170 μm through-holes was provided in a 5 mm×20 mm area of 20 μm-thick Ti foil by means of etching, thereby fabricating perforated Ti foil having an opening ratio of 58%. A microscopic observation confirmed that the holes were straight holes substantially parallel to the film thickness direction of the Ti foil.

A dye-sensitized solar cell was fabricated in the same way as in the examples for a step of printing titania paste (trade-named Nanoxide D and made by Solaronix) on a 5 mm×20 mm area of one side of the Ti foil on which the through-holes were provided and for subsequent steps. The photoelectric conversion efficiency of the dye-sensitized solar cell thus obtained was 3.7%.

REFERENCE SIGNS LIST 10, 10a: Dye-sensitized solar cell
12: Transparent substrate
14: Conductive substrate
16: Porous semiconductor layer
18, 18a: Conductive metal layer
20: Electrolyte
22: Spacer
24: Perforated metal foil

The invention claimed is:

1. A dye-sensitized solar cell comprising:
   a transparent substrate;
   a conductive substrate serving as a cathode electrode;
   a porous semiconductor layer containing a dye adsorbed thereto and arranged between the transparent substrate and the conductive substrate in vicinity to or contact with the transparent substrate; and
   a conductive metal layer arranged in contact with a side of the porous semiconductor layer opposite to the transparent substrate and serving as an anode electrode,
   the dye-sensitized solar cell containing an electrolyte sealed therein, wherein the conductive metal layer is formed of a metallic porous body sheet having through-holes, a multitude of the through-holes of the metallic porous body sheet are isotropically communicated with one another, and the metallic porous body sheet has a specific surface area of at least 0.1 m$^2$/g, a porosity of at least 30 vol. % and at most 60 vol.%, and a pore diameter of at least 1 μm and at most 40 μm in combination.

2. The dye-sensitized solar cell according to claim 1, wherein the metallic porous body is a calcined body made of metal microparticles, and the size of the metal microparticles is 100 μm or smaller in diameter.

3. The dye-sensitized solar cell according to claim 1, wherein the metallic porous body sheet is formed of one or more than one metal material selected from the group consisting of Ti, W, Ni, Pt and Au.

4. The dye-sensitized solar cell according to claim 1, including perforated metal foil or a metal mesh provided on a surface of the conductive metal layer opposite to the porous semiconductor layer.

* * * * *